United States Patent [19]

Nagata et al.

[11] 4,298,628

[45] Nov. 3, 1981

[54] METHOD FOR MANUFACTURING FRIED TOFU PRODUCTS

[75] Inventors: Toshiyuki Nagata; Masahiko Terashima; Kazuto Mashima, all of Osaka, Japan

[73] Assignee: Fuji Oil Company, Ltd., Osaka, Japan

[21] Appl. No.: 66,821

[22] Filed: Aug. 14, 1979

[30] Foreign Application Priority Data

Aug. 24, 1978 [JP] Japan ................................. 53-103565

[51] Int. Cl.$^3$ .............................................. A23J 3/00
[52] U.S. Cl. .................................................. 426/656
[58] Field of Search ......................... 426/656, 438, 94

[56] References Cited

U.S. PATENT DOCUMENTS 3,950,550 4/1976 Katayama et al. .................... 426/94

OTHER PUBLICATIONS

Shurtleff, *Tofu & Soymiek Production*, vol. II, New Age Foods Study Center, 1979, pp. 96, 123–128, 187 and 194.
Wolf et al., *Soybeans as a Food Source*, Chemical Rubber Co., 1971, U.S.A., p. 43.

*Primary Examiner*—Joseph M. Golian
*Assistant Examiner*—Elizabeth A. Hatcher
*Attorney, Agent, or Firm*—Wenderoth, Lind & Ponack

[57] ABSTRACT

A method for manufacturing a fried tofu product comprises kneading a mixture of vegetable proteinaceous material containing about 60% or more by weight based on the weight of the solids thereof with water, adding an alkaline earth metal compound as a coagulating agent in an amount of 1% or more by weight, shaping the mixture into any desired shape and deep-frying the same, thereby providing a fried tofu product.

12 Claims, No Drawings

METHOD FOR MANUFACTURING FRIED TOFU PRODUCTS

BACKGROUND OF THE INVENTION

The present invention relates to a method for manufacturing fried tofu products.

"Tofu" or a bean curd is one of the most popular, traditional soybean foods in Eastern Asia and is an important source of protein for people living in this region. It is a watery, white, jelly-like fragile product having a moisture content as high as 88 weight percent. In most cases, tofu is prepared by complicated manual processes. In a typical process, soybeans, as the raw material, are soaked in water for a prolonged period of time, for example, 8 to 24 hours according to the season, and the soaked soybeans are ground to form a slurry thereof. This slurry is heated to extract the soy protein in the form as dissolved in the water phase and then filtered through a coarse cloth to remove insoluble soybean refuse which consists mainly of pulverized cellular substances and is generally known as "okara". The filtrate or soy milk is subsequently coagulated to form a curd by adding a coagulating agent, such as non-toxic alkaline earth metal salt, such as calcium sulfate, calcium chloride or magnesium chloride, and the whey is separated from the curd by draining. In recently developed processes, certain organic gamma or delta lactones of aldonic and uronic acids, such as D-glucono-δ-lactone, are used as the coagulating agent and the necessity of the whey draining process is eliminated. Notwithstanding this improvement, the prior art processes used for making the tofu or bean curd still require many laborious, time-consuming procedures and generally are not adaptable for automated mass production.

While tofu itself, either boiled or not boiled, is edible with or without being seasoned, it can be used as a foodstuff in several different forms. In Eastern Asia, it is commonly consumed as a fried product and "aburage" ("age" as it is often referred to for short) is one of the most common forms of fried tofu in Japan.

Aburage is generally square in shape and is prepared by slicing the bean curd into relatively thin slices, pressing the slices to adjust the moisture content to about 80 to 82% and then deep frying in several, for example, two, successive stages. Aburage is consumed chiefly in a cooked state or in a toasted state with appropriate condiments and/or seasonings.

Occasionally, aburage is also consumed as an edible casing or wrapping for other foodstuffs. This aburage casing is prepared by diagonally cutting a square piece of aburage to form two triangular pieces, each triangular piece being then slit open along the cut edge to form a bag. "Inarizushi", a sort of "sushi" popular in Japan, is prepared by stuffing the aburage bag with a vinegared rice. On the other hand, daily dishes can be prepared by stuffing aburage bags with various comminuted vegetables and fastening the stuffed bags with an edible string or cord, such as "kanpyo" made from the fruits from certain convolvulacean and lagenarian plants. Aburage can be cut into two rectangular pieces, each of which is slit open along the cut edge to form a bag which is used in a similar manner.

Another type of fried tofu products is "ganmodoki", also called "hirouse" or "hiryozu", which is prepared by crushing or grinding the drained bean curd, mixing a curd binder, such as dioscorean yams (e.g., *D. japonica thunb.* or *D. betatas decne.*), and minced vegetables with the ground bean curd, forming this mixture into a desired shape, and then deep frying the shaped mixture in several, for example, two, successive stages. This product is also consumed in a manner similar to aburage.

U.S. Pat. No. 3,950,550 which issued on Apr. 13, 1976 and the invention of which has been assigned to the same assignee of the present invention, discloses a method for manufacturing a fried tofu product without utilizing such a coagulating agent as used in the traditional, old fashioned but still existing, method hereinbefore described. According to this U.S. patent, a heat coagulable soy protein, for example, a dried or aqueous soy protein isolate, a curd of acid-precipitated soy protein or a soy protein concentrate from which either the soybean refuse or the soy whey has been removed, is used. Specifically, a fried tofu product according to this U.S. patent is manufactured by kneading about 15 to 45 parts by weight of heat coagulable soy protein and 0 to 100 parts by weight of an edible oil or fat together with 100 parts of water with or without the addition of 1 to 10 parts by weight of an egg ingredient, for example, the egg yolk, egg white or both, to provide a plastic-like moldable soy protein dough, shaping the dough into any desired shape, and deep frying the shaped dough in successive stages from under 135° C. to over 135° C.

If the soy protein dough is molded into a sheetlike shape during the shaping procedure, the resultant fried tofu product is aburage.

In view of the fact that the fried tofu product such as aburage can be manufactured directly from the soy proteinaceous material without the formation of the tofu or bean curd which has been required according to the traditional method, the method of the above mentioned U.S. patent involves the following advantages.

(a) The automated mass production of fried tofu products has been enabled.

(b) While the fried tofu products are often desired to be stored in a frozen state for a prolonged period of time, the employment of the alkaline earth metal salt as a coagulating agent such as practised in the manufacture of the traditional tofu products tends to accelerate the denaturation of soy protein when the fried tofu products are frozen. However, the method of the above mentioned U.S. patent does not employ any coagulating agent and, therefore, the fried tofu product manufactured thereby can be stored in a frozen state for a prolonged period of time without being denaturized, is easy to handle and can readily be transported from place to place without being substantially spoiled.

(c) As compared with the fried tofu product manufactured by the traditional method by way of the formation of the tofu or bean curd, the fried tofu product according to the above mentioned U.S. patent has no tendency of losing its shape even when boiled too much, has a moderate, satisfactory mouthfeel or chewiness and can readily be flavored.

Because of these advantages, the fried tofu product according to the above mentioned U.S. patent is largely employed as one of ingredients of "instant" foods and also an accessory to the main dishes, but has been found unsatisfactory and not suited for use in the preparation of the inarizushi which generally requires the use of a bag of a fried tofu product having a relatively firm texture.

SUMMARY OF THE INVENTION

Accordingly, the present invention has been developed to provide a method for manufacturing fried tofu products having an improved texture, particularly, an improved skin texture.

Another important object of the present invention is to provide a method for manufacturing fried tofu products of the type referred to above which are not susceptible to denaturation even when frozen and which can, therefore, be stored for a prolonged period of time without being spoiled.

During a series of research and development we have made to improve the method of the above mentioned U.S. patent to enable the production of the fried tofu product, i.e., aburage or ganmodoki, we have found the following facts.

(1) When calcium sulfate such as used in the traditional tofu manufacturing method is employed in a predetermined amount or more in the dough composition disclosed in the above mentioned U.S. patent, a fried tofu product having an improved skin texture and capable of retaining its shape even when boiled too much can be obtained.

(2) When an alkaline earth metal salt is used even in a relatively large amount in the dough composition disclosed in the above mentioned U.S. patent, a resultant fried tofu product which is substantially insusceptible to denaturation even when frozen can be obtained.

(3) However, when calcium chloride such as used in the traditional tofu manufacturing method is employed in a similar amount in the dough composition, curding of the dough takes place with releasing water from the dough composition such as occurring in the case of tofu-curd formation from soybean milk and the soy protein dough when deep fried to provide the fried tofu product does not sufficiently expand. Therefore, the resultant fried tofu product has a texture worse than that manufactured without the use of such coagulating agent.

(4) The difference in property between the fried tofu products respectively manufactured by the use of calcium sulfate and calcium chloride appears to result from the difference in water solubility between these coagulating agents.

(5) When a coagulating agent, such as calcium chloride, having a high water solubility is used in the dough composition together with an alkalifying agent, the combination of the coagulating agent with the alkalifying agent gives an effect similar to that given by a coagulating agent having a low water solubility and, therefore, no water-release takes place in the dough composition.

The present invention is based on the above described finding, the details of which will now be described.

DETAILED DESCRIPTION OF THE INVENTION

According to the present invention, an improved fried tofu product such as an aburage or abura-age and ganmodoki is prepared from a kneaded dough of vegetable proteinaceous material rather than from a tofu or soybean curd formed by the traditional method discussed hereinbefore. The kneaded dough may be of a composition identical with that disclosed in the above mentioned U.S. patent and is prepared by kneading a mixture of a vegetable proteinaceous material, containing a coarse protein in an amount equal to or higher than 60% by weight based on the weight of the dry solids of the proteinaceous material, and a water with or without oil or fat.

The kneaded dough so obtained is then molded into any desired shape, the shaped dough being in turn deep fried in oil in several, for example, two or three, successive stages, in a manner similar to that disclosed in the above mentioned U.S. patent. Preferably, the frying process is carried out at different temperatures for different times in these successive stages.

The present invention is characterized in that, prior to the molding of the kneaded dough, a coagulating agent of alkaline earth metal compound is added to the dough composition in such an amount, equal to or higher than 1% by weight based on the weight of the crude protein contained in the dough composition, that no water-release takes place in the dough composition.

The alkaline earth metal compound which may be used as a coagulating agent in the practice of the method of the present invention includes a salt of alkaline earth metal and a hydroxide of alkaline earth metal such as calcium hydroxide. The alkaline earth metal salt referred to above includes calcium sulfate ($CaSO_4.2H_2O$) having a water solubility of $0.223^0$ or $0.257^{50}$ relative to 100 gr. of water, calcium chloride ($CaCl_2.2H_2O$) having a water solubility of $97.7^0$ or $326^{60}$ relative to 100 gr. of water, magnesium sulfate ($MgSO_4.7H_2O$) having a water solubility of $72.4^0$ or $178^{40}$ relative to 100 gr. of water, and magnesium chloride ($MgCl_2.6H_2O$) having a water solubility of $281^0$ or $918^{100}$ relative to 100 gr. of water.

The coagulating agent must be added to the dough composition at any time prior to the molding of the kneaded dough. The addition of the coagulating agent must be carried out in such a manner as to avoid any possible occurrence of water-release in the dough composition. If the water-release occurs in the dough composition, the dough will not sufficiently expand when deep fried and, therefore, the fried tofu product will exhibit an inferior skin texture with relatively fine voids appearing on the surface thereof, as compared with that manufactured without the employment of the coagulating agent.

The process of addition of the coagulating agent practiced in the method of the present invention is quite different from that effected to the heated soy milk during the practice of the traditional tofu manufacturing method. However, in order to prepare the moldable dough by the use of the vegetable proteinaceous material having a relatively high content of protein and accordingly a relatively high water absorbability, the dough composition must contain a predetermined amount of water even though it is not comparable to or higher than the amount of the soy milk employed in the practice of the traditional tofu manufacturing method. By way of example, where the vegetable proteinaceous material is employed in the form of isolated soy protein, the dough composition according to the present invention contains 18 to 54, preferably, 30 parts by weight of the isolated soy protein relative to 100 parts by weight of water.

Accordingly, in order to avoid any possible water-release occurring in the dough composition, the type of coagulating agent must be carefully selected and, depending upon the type of coagulating agent, a special handling is required.

By way of example, where the alkaline earth metal salt having a low water solubility, such as calcium sulfate, is selected, it can be employed in an amount equal to or higher than 30% of the total weight of the crude protein without being accompanied by the water-release and also reduction in thermal expandability.

On the contrary thereto, where the alkaline earth metal salt having a high water solubility, such as calcium chloride or magnesium sulfate, is selected, the water-release takes place when it is employed in an amount equal to or higher than 1.5% of the total weight of the crude protein. This means that the dough composition when deep fried does not expand. In this case, any known alkalifying agent should be employed in combination with the specific coagulating agent having a high water solubility so that both can cooperate with each other to provide an effect similar to that given by the use of an comparable amount of the coagulating agent having a low water solubility. The minimum amount of the alkalifying agent to be employed in combination with the coagulating agent of high water solubility in the practice of the method of the present invention can be determined by conducting a series of experiments and should be such that the addition thereof will not result in a water-release occurring in the dough composition. However, if an excessive amount of the alkalifying agent is employed, the dough composition tends to absorb a relatively large amount of oil during the frying process, giving the fried tofu product which has a high oil content and which is, therefore, susceptible to reduction in quality.

The amount of the alkalifying agent required to avoid any possible water-release when added to the dough composition together with the coagulating agent of high water solubility and also to prevent the dough composition from absorbing oil excessively during the frying, can also be determined in consideration of the pH value of the dough composition in which the coagulating agent has already been added, which pH value is generally within the range of 6.7 to 7.4.

The addition of the coagulating agent may be carried out at any time, but must be before the molding or shaping process. Specifically, where the vegetable proteinaceous material employed is in the form of a powder, the addition of the coagulating agent may be carried out during the blending of the powdery vegetable proteinaceous material with water, but prior to the molding or shaping process. On the other hand, where the vegetable proteinaceous material employed is wet, not dry such as a powder, the addition of the coagulating agent may be carried out not only during the blending process or to the kneaded dough, but also during the preparation of the wet vegetable proteinaceous material partially or wholly. Where the coagulating agent employed is of a type having a high water solubility, the addition of it during the preparation of the vegetable proteinaceous material is advantageous in that the addition of the alkalifying agent can be carried out in one state as will be described later.

The vegetable proteinaceous material employed in the present invention should be of a type containing a crude protein in an amount equal to or higher than about 60% by weight based on the weight of the dry solids of the vegetable proteinaceous material.

Where the vegetable proteinaceous material having a low content of the crude protein, such as a powder of soybeans, a powder of defatted soybeans or a powder of dried soybean milk, is employed, not only does it lack a sufficient coagulability, but also any one of the kneading and molding of the dough composition cannot readily be carried out, resulting in that the ultimate fried tofu product takes unfavorable beany flavor.

Also, when even the vegetable proteinaceious material having a lower content of the crude protein is heat-treated, the heat coagulability thereof will be improved to such an extent that the kneading and molding can more or less readily be carried out. However, the amount of water that can be mixed with it is limited, not only involving the increased manufacturing cost, but also resulting in the production of the fried tofu product having an unfavorable taste and having an internal structure colored brown. (An aburage or abura-age is generally colored light brown on the external surface and white in the internal structure. The light brown color on the external surface has resulted from frying, but the internal structure retains the original, white color.)

In view of the above, the employment of the vegetable proteinaceous material containing a relatively highly refined protein gives an excellent taste and an excellent texture and, for this purpose, the use of isolated soy protein (containing a protein in an amount of 90% or more) appears feasible. However, where a delicate taste and a delicate color as compared with that afforded by the fried tofu product manufactured according to the traditional method are desired in the fried tofu product manufactured according to the method of the present invention, the vegetable proteinaceous material employed may be mixed with a roughly refined protein, such as dehulled soybeans, defatted soybeans or soy milk. Where the roughly refined protein, for example, a powder of soybeans or a powder of defatted soybeans, is employed, the amount thereof is preferably 1 to 15 parts by weight relative to 100 parts by weight of the isolated soy protein powder. The vegetable proteinaceous material employed in the present invention is preferably of a type heat-treated. The heat-treated vegetable proteinaceous material exhibits excellent heat coagulability and emulsivity and the dough composition prepared by the use of such heat-treated vegetable proteinaceous material can readily be kneaded and shaped with no difficulty. Accordingly, the use of the vegetable proteinaceous material of the type prepared by dissolving an alkalifying agent in a curd of acid-precipitated soy protein and then heat-treating the mixture is feasible. The vegetable proteinaceous material so prepared may be in the form of either a powder or a slurry. However, the use of the heat-treated vegetable proteinaceous material in the form of a slurry is advantageous in that no subsequent drying process is required, it can readily be kneaded without requiring the addition of water, and the cost required to heat it is less than that required to heat when it is in a liquid phase. In addition to these advantages, the following advantages can also be appreciated. Namely, where the coagulating agent of high water solubility is employed, the addition of the alkalifying agent effective to neutralize the curd of acid-precipitated soy protein and also to avoid reduction of the pH value which would result from water-release occurring as a result of the use of the highly water-soluble coagulating agent, can be carried out in a single state and no two-stage pH adjustment is required. In addition, during the process in which the curd of acid-precipitated soy protein by the use of an alkaline metal hydroxide such as calcium hydroxide as a neutralizing agent, the amount of the alkaline earth metal salt to be used can be reduced by the amount of the neutralizing agent used. Furthermore, while care is required to avoid any formation of lumps when the vegetable proteinaceous material which has once been dried to provide a powder thereof is subsequently dissolved in a water and also to avoid any possible insufficient dissolution thereof into the water which would otherwise result in insufficient expansion of the fried tofu product, not only can such a possibility be avoided, but the skin texture and the color of the ultimate fried tofu product can also be improved, if the vegetable proteinaceous material not dried is used.

The amount of the alkaline earth metal compound which is used as a coagulating agent must be 1% or more by weight relative to the weight of the crude protein contained in the dough composition. If it is less than 1% by weight, the resultant fried tofu product will give a skin texture having a physical strength comparable with that of the fried tofu product manufactured without the use of any coagulating agent and, if it is more than about 5% by weight, the resultant fried tofu product will give a skin texture having a physical strength comparable with that of the fried tofu product manufactured by the use of tofu or soybean curd. However, if the amount of the coagulating agent exceeds 15% by weight relative to the weight of the crude protein contained in the dough composition, any appreciable improvement in skin texture will no longer take place. In particular, if calcium sulfate is used in an amount in excess of 15% by weight, the resultant fried tofu product will undesirably become bitter.

Table 1 illustrates how the amount of calcium sulfate affects the physical strength of the skin texture of the fried tofu product, i.e., aburage, manufactured by kneading with 30 parts by weight of water a mixture of 10 parts by weight of isolated soy protein powder (having a 6% water content and 90% by weight of coarse protein) and 3 parts by weight of oil and fat, then shaping the kneaded mixture and deep-frying. The evaluation of the products was performed by means of an organopeptic test within the rating point of 5 was given to the aburage manufactured without the use of calcium sulfate and the rating point of 10 was given to the aburage manufactured from tofu or soybean curd.

TABLE 1

| Amount of CaSO$_4$ . 2H$_2$O (wt%)* | 0 | 0.8 | 2 | 5 | 10 | 15 | 20 | 30 |
|---|---|---|---|---|---|---|---|---|
| Physical Strength of Skin Texture** | 5.0 | 5.3 | 6.4 | 8.3 | 9.6 | 10.5 | 11.0 | 11.4 |

*This percentage by weight is relative to the total weight of the isolated soy protein powder. The percentage by weight relative to the crude protein can be obtained by multiplying each value by 1.18.
**Based on an average value of 10 samples for each amount of the coagulating agent.

The fried tofu product manufactured without the use of the coagulating agent such as disclosed in the earlier mentioned U.S. patent is excellent as compared with the fried tofu product manufactured from tofu or soybean curd such as according to the traditional method so far as the capability of the fried tofu product to retain its shape even when it is boiled too much is involved. However, this capability of the fried tofu product can further be improved when the coagulating agent is employed. Moreover, even if the amount of the coagulating agent employed is relatively large, there will be no substantial denaturation of the fired tofu product which would occur when the fried tofu product is frozen. Although the exact cause that the addition of the coagulating agent brings about such advantages as hereinbefore described has not yet been known, it appears that the relationship or combination of the alkaline earth metal compound and the protein, which is gentle as compared with that exhibited in the traditional tofu manufacturing method, is involved.

Hereinafter, the present invention will be described by way of examples. It is to be noted that the following examples are for the purpose of illustration of the present invention and, therefore, should not be construed as limiting the present invention thereto.

EXAMPLE I 10 kg of commercially available isolated soy protein powder (sold under a brand name of "FUJIPRO-R", a sodium proteinate, by the assignee of the present invention), 3.3 kg of salad oil, 30 kg of water and 1.2 kg of calcium sulfate dihydrate were admixed and kneaded in a silent cutter for 10 minutes to provide a dough. This dough was subsequently shaped into a number of shaped moldings square in shape with the length of each side being 45 mm and having a thickness of 5 mm, which were in turn deep fried in three successive stages first at 75° C. for 6 minutes, then at 110° C. for 3 minutes and finally at 175° C. for 3 minutes to provide aburages.

The aburage so obtained, the aburage manufactured without the use of calcium sulfate and the traditional aburage manufactured from tofu or soybean curd were simultaneously boiled for 5 minutes and, after having been placed on a mesh basket to drain water therefrom, were allowed to cool. These products were then tested as to the elongability thereof by the use of Schopper's fiber tensile tester (manufactured by Shimadzu Ltd. of Japan). The result was that the aburage according to the present invention, the aburage manufactured without the addition of calcium sulfate and the aburage according to the traditional method exhibited 750 gr., 395 gr. and 765 gr. respectively, in elongability.

EXAMPLE II 10 kg of the same soy protein powder as used in Example I, 8 kg of salad oil, 30 kg of water and 0.9 kg of calcium sulfate dihydrate were admixed and kneaded in a silent cutter for 15 minutes to provide a paste which was subsequently mixed with chopped vegetables such as carrot, "shiitake" (a kind of mushroom), "hijiki" (*Turbinaria fusiformis*) and "kombu" (*Laminaria japonica*), with the addition of table salt, sugar and monosodium glutamate in an appropriate amount and kneaded for 1 to 2 minutes to provide a dough. This resultant dough was then shaped into a number of disc-shaped moldings, each 58 mm in diameter and 12 mm in thickness, which were in turn deep-fried in three successive stages first at 110° C. for 5 minutes, then at 130° C. for 2 minutes and finally at 150° C. for 3 minutes to provide ganmodokis.

The ganmodoki so obtained, the ganmodoki manufactured without the use of calcium sulfate and the traditional ganmodoki manufactured from tofu or soybean curd were boiled. The respective times required to boil these products until they when picked up by the use of a pair of chopsticks could no longer retain their shape were 23 minutes, 10 minutes and 7 minutes. This means that the ganmodoki according to the present invention has an excellent physical strength as compared with those of the other two products.

EXAMPLE III 10 kg of the same soy protein powder as used in Example I, 3.3 kg of salad oil, 0.2 kg of flakes of defatted soybeans, 0.05 kg of sodium bicarbonate and 0.43 kg of calcium sulfate dihydrate were admixed, kneaded, shaped and deep-fried in the same manner as in that in Example I. The pH value of the dough composition, the presence and absence of water-release occurring in the dough composition, the elongability of the product and the oil absorbability of the product were tested, the results of which are shown in Table 2.

EXAMPLE IV

In preparing the aburage, the same material as in Example III except for the calcium sulfate which had been replaced with 0.5 kg of calcium chloride dihydrate and 0 to 0.1 kg of sodium carbonate monohydrate (alkalifying agent) were admixed, kneaded, shaped and deep-fried in the same manner as in Example I. The resultant aburages containing different amounts of the alkalifying agent as listed in Table 2 were tested in a manner similar to that in Example II, the results of which are shown in Table 2. The physical strength of the fried tofu product wherein the alkalifying agent was used appears to be comparable with or equal to that of the fried tofu product wherein the calcium sulfate such as in Example II was used.

TABLE 2

| | Coagulating Agent | | | | |
|---|---|---|---|---|---|
| | $CaSO_4 \cdot 2H_2O$ | $CaCl_2 \cdot 2H_2O$ | | | |
| Alkalifying agent | — | 0 kg | 0.03kg | 0.05kg | 0.10kg |
| pH | 6.90 | 6.58 | 6.91 | 7.21 | 7.50 |
| Water-release | No | Oc-cured | No | No | No |
| Expansion (times) | 3.0 | 1.1 | 2.70 | 2.85 | 3.0 |
| Oil Absorbability | — | — | — | ± | ++ |

EXAMPLE V

The same materials as in Example I except for the calcium sulfate which had been replaced with 0.5 kg of magnesium sulfate heptahydrate and sodium carbonate monohydrate (alkalifying agent) were admixed, kneaded, shaped and deep-fried in the same manner as in Example I. The resultant aburage was tasty and exhibited a physical strength and a taste both superior to the aburage manufactured without the addition of magnesium sulfate and sodium carbonate. The aburage so obtained has shown the point of 7.4 when organoptically evaluated according to the method shown in Table 1.

EXAMPLE VI

A curd of acid-precipitated soy protein containing 92% by weight of crude protein relative to the weight of the dry solids thereof and prepared from low-modified defatted soybeans was centrifuged to have a 84% water content and was then stirred in a silent cutter while a solution of 20% sodium hydroxide was poured to mix with the acid-precipitated soy protein curd. After the curd had become dissolved, calcium chloride was added in an amount of 2% by weight relative to the weight of the soy protein to the dissolved curd resulting in the pH value of 6.9. The neutralized paste so obtained was then heated by the use of a continuous heating machine, wherein the dissolved curd was allowed to flow therethrough at a rate of 100 kg/hr and was heated to 130° measured as it emerged from the machine, and was quickly cooled to 55° C. to give a proteinaceous paste having a 82% water content and having an excellent heat coagulability.

11.1 kg of this isolated soy protein paste was, whereto a coagulating agent had been added, mixed with 0.9 kg of the same soy protein powder as in Example I and 0.9 kg of salad oil, the mixture being subsequently kneaded in a Stephan cutter. The kneaded mixture is thereafter molded and deep-fried in three successive stages first at 75° C. for 3 minutes, then at 110° C. for 3.5 minutes and finally at 175° C. for 3 minutes.

The resultant fried tofu product was an aburage having an excellent skin texture.

EXAMPLE VII

The same materials as in Example VI except for the salad oil which was employed in an amount of 2.4 kg were kneaded, mixed with the same chopped vegetables as in Example II with the addition of the same condiments as in Example II and, after having been shaped, deep-fried in the same manner as in Example II. The resultant fried tofu product was a ganmodoki having a sufficient physical strength.

EXAMPLE VIII 12 kg of the same isolated soy protein paste containing the coagulating agent as in Example VI, except for the water content of the curd after having been centrifuged being 79% (76.5% after having quickly cooled to 55° C.) was mixed with 0.9 kg of refined soy oil and 0.3 kg of calcium sulfate dihydrate and then kneaded in a silent cutter. The kneaded mixture was thereafter molded and deep-fried in the same manner as in Example I.

The resultant fried tofu product was an aburage having a skin texture comparable with that of the aburage manufactured from tofu or soybean curd and exhibiting the point of 9.6 according to the organopeptic test similar to that shown in Table 1. In addition, the aburage so obtained shows a bright brown color on the surface thereof.

EXAMPLE IX

The acid-precipitated soy protein curd having the 84% water content, such as obtained in Example VI was adjusted so as to have a pH value of 6.8 by the use of an aqueous suspension containing 20 wt% of a mixture consisting of sodium hydroxide and calcium hydroxide in a ratio of 1:3. The neutralized paste was subsequently heated by the use of a continuous heating machine wherein the paste was allowed to flow therethrough at a rate of 100 kg/hr and was heated to 130° C. measured as it emerged from the machine, and was quickly cooled to 55° C. The water content at the time of completion of the quick cooling was 81.8%.

11.1 kg of this isolated soy protein paste was mixed with 0.9 kg of the same protein powder as in Example I and 0.9 kg of salad oil, the resultant mixture being then kneaded, shaped and deep-fried in the same manner as in Example I. The resultant fried tofu product was an aburage having a bright brown color on the surface thereof, exhibiting the point of 7.0 according to the organopeptic test similar to that shown in Table 1.

Although the present invention has fully been described in connection with the preferred embodiments thereof, it should be noted that various changes and modifications are apparent to those skilled in the art. Accordingly, such changes and modifications are to be understood as included within the true scope of the present invention unless they depart therefrom.

We claim:

1. A method for manufacturing a fried tofu product comprising:

kneading a mixture of a soy proteinaceous material containing a crude protein in an amount of 60% or more by weight relative to the weight of the dry solids thereof with water;

adding a salt or hydroxide of calcium or magnesium in an amount of 1% or more by weight relative to the weight of the crude protein, in such a manner as to avoid any possible water-release from the mixture;

shaping the mixture containing the calcium or magnesium compound into any desired shape; and deep-frying the shaped mixture.

2. A method as claimed in claim 1, wherein the addition of the calcium or magnesium compound is carried out prior to the shaping of the mixture.

3. A method as claimed in claim 2, wherein the calcium or magnesium compound is of low water solubility.

4. A method as claimed in claim 2, wherein the calcium or magnesium compound is of high water solubility and the method further comprises the step of adding an alkalifying agent to the mixture.

5. A method as claimed in claim 2, wherein said soy proteinaceous material is prepared by adding an alkalifying agent to a curd of acid-precipitated soy protein to dissolve said curd and then heating the dissolved curd.

6. A method as claimed in claim 5, wherein at least a portion of the soy proteinaceous material is in the form of a slurry.

7. A method as claimed in claim 1, wherein the amount of the calcium or magnesium compound used is within the range of 5 to 15% by weight.

8. A method as claimed in claim 2, wherein the amount of the calcium or magnesium compound used is within the range of 5 to 15% by weight.

9. A method as claimed in claim 3, wherein the amount of the calcium or magnesium compound used is within the range of 5 to 15% by weight.

10. A method as claimed in claim 4, wherein the amount of the calcium or magnesium compound used is within the range of 5 to 15% by weight.

11. A method as claimed in claim 5, wherein the amount of the calcium or magnesium compound used is within the range of 5 to 15% by weight.

12. A method as claimed in claim 6, wherein the amount of the calcium or magnesium compound used is within the range of 5 to 15% by weight.

* * * * *